United States Patent [19]

Paske

[11] Patent Number: 4,698,501

[45] Date of Patent: Oct. 6, 1987

[54] SYSTEM FOR SIMULTANEOUS GAMMA-GAMMA FORMATION DENSITY LOGGING WHILE DRILLING

[75] Inventor: William C. Paske, Pearland, Tex.

[73] Assignee: NL Industries, Inc., New York, N.Y.

[21] Appl. No.: 734,963

[22] Filed: May 16, 1985

[51] Int. Cl.[4] ............................................. G01V 5/12
[52] U.S. Cl. .................... 250/265; 250/266; 250/264
[58] Field of Search ............... 250/256, 265, 266, 264, 250/269

[56] References Cited

U.S. PATENT DOCUMENTS

| | | |
|---|---|---|
| 2,785,314 | 3/1957 | Grahame ............................ 250/265 |
| 2,934,652 | 4/1960 | Caldwell et al. . |
| 3,281,599 | 10/1966 | Baker et al. . |
| 3,333,466 | 8/1967 | Oliver . |
| 3,840,706 | 10/1974 | Krasin et al. . |
| 3,846,631 | 11/1974 | Kehler . |
| 4,048,495 | 9/1977 | Ellis . |
| 4,169,979 | 10/1979 | Arnold et al. . |
| 4,180,727 | 12/1979 | Givens . |
| 4,297,575 | 10/1981 | Smith, Jr. et al. . |
| 4,342,911 | 8/1982 | French . |
| 4,492,865 | 1/1985 | Murphy et al. ..................... 250/265 |
| 4,596,926 | 6/1986 | Coope ............................... 250/265 |

Primary Examiner—Janice A. Howell
Assistant Examiner—David P. Porta
Attorney, Agent, or Firm—Browning, Bushman, Zamecki & Anderson

[57] ABSTRACT

A system for logging subterranean formations for the determination of formation density by using gamma radiation. Gamma ray source and detection means are disposed within a housing adapted for positioning within a borehole for the emission and detection of gamma rays propagating through earth formations and borehole drilling fluid. The gamma ray detection means comprises first and second gamma radiation sensors geometrically disposed within the housing the same longitudinal distance from the gamma ray source and diametrically opposed in a common plane. A formation matrix density output signal is produced in proportion to the output signal from each of the gamma ray sensors and in conjunction with certain constants established by the geometrical configuration of the sensors relative to the gamma ray source and the borehole diameter. Formation density is determined without regard to the radial position of the logging probe within the borehole in a measuring while drilling mode.

26 Claims, 7 Drawing Figures

SYSTEM FOR SIMULTANEOUS GAMMA-GAMMA FORMATION DENSITY LOGGING WHILE DRILLING

BACKGROUND OF THE INVENTION

1. Field of the Invention

The invention relates to logging of subterranean formations for the determination of formation density by using gamma radiation and, more particularly, to the determination of formation density while drilling a borehole traversing the earth formation. Most particularly, the invention relates to the determination of formation density without regard to the radial position of the logging probe within the borehole or collimation of the gamma radiation employed to obtain density measurements.

2. History of the Prior Art

In the drilling of boreholes into formations in the earth, it is highly desirable to obtain information related to the nature and structure of the formation through which the borehole is passing while drilling is in progress. Being able to provide to the drilling operator information related to the characteristics of the formations while drilling is in progress enables logging of the borehole during drilling and, hence, much more efficient operation. Such measuring-while-drilling (MWD) logging either partially or totally eliminates the necessity of interrupting the drilling operation to remove the drill string from the hole in order to pass wire line logging sondes into the borehole for logging the characteristics of the formations therealong. In addition, the ability to log the characteristics of the formation through which the drill bit is passing, such as the density of the formation, greatly enhances the safety of the drilling operation. The drilling operator may thus be notified of the entry of the borehole into formations which may be likely to produce hazardous drilling conditions, such as blow out.

Heretofore, numerous techniques have been used in the wire line logging of drilled boreholes in order to determine the nature of the formations through which the borehole passes. One technique for formation density logging has included gamma ray density probes which are devices incorporating a gamma ray source and a gamma ray detector, shielded from each other to prevent the counting of gamma radiation by the detector which emanates directly from the source. During the operation of the probe, gamma rays (photons) are emitted from the source and enter the formation to be studied. In the formation they interact with the atomic electrons of the material of the formation by either photoelectric absorption, by Compton Scattering, or by pair production. In both photoelectric absorption and pair production phenomena, the particular photons involved in the interaction process are removed from the gamma ray beams.

In the Compton Scattering process, the involved photon loses some of its energy while changing its original direction of travel, the loss of energy being a function of the scattering angle. Some of the photons emitted from the source into the formation material are accordingly scattered back toward the detector. Many scattered rays do not reach the detector, since their direction is again changed by a second Compton Scattering, or they are thereafter absorbed by the photoelectric absorption process or the pair production process. The scattered photons which reach the detector and interact with it, are counted by electronic counting equipment associated with the detector.

Major difficulties encountered in conventional gamma ray density measurement include rigorous definition of the sample size and the limited effective depth and sampling times. Other major difficulties include the disturbing effects of undesired interferring materials located between the density probe and the formation sample, such as drilling mud and mud cake on the borehole wall, which have required that the probe be positioned directly against the borehole wall.

Numerous prior art wire line gamma radiation logging probes have tried to compensate for the effect on formation density measurements produced by the density of the mudcake on the walls of the borehole by providing two detectors axially spaced along the borehole at different distances from the source of radiation. The near, or short spaced detector is for receiving radiation which has scattered mainly in the materials near the borehole wall, and therefore in the mudcake. The far, or longspaced detector is for receiving radiation which has scattered principally in the formation.

Most prior art gamma logging systems have required complex collimation schemes to narrowly define either the beam of radiation emanating from the source to direct it into a specific region of the formation or the beam of radiation received back by the detector to insure that only radiation back-scattered from a particular region of the formation was detected, or both. In addition, prior art wire line gamma ray logging sondes have been highly susceptible to variation in density measurements due to the thickness of the drilling mud as well as the mud cake on the walls of the borehole through which the radiation must pass and, thus, the accuracy of the measurements is strongly affected by the eccentricity of the tool within the borehole. For this reason, prior art tools include elaborate mechanisms for pressing the surface of the tool firmly against the wall of the borehole on the side of the borehole at which point measurement is being made.

Needless to say the difficulties encountered in prior art wire line gamma radiation logging would be further complicated if the density measurement tool is made part of a drill string and operated during drilling of the borehole. The only known gamma radiation formation density probe useful in measurement while drilling apparatus is shown in U.S. patent application Ser. No. 478,979, filed Mar. 25, 1983, now abandoned, by Daniel Coope, entitled Formation Density Logging While Drilling, and assigned to the assignee of the present invention. This application discloses a technique for gamma-gamma formation density logging while drilling which relies upon the collimation of gamma radiation and a pair of axially spaced detectors along the borehole from one another and from the source of radiation in order to examine radiation back-scattered from two different regions within the formation at different distances from the walls of the borehole.

One prior art wire line density probe which functions regardless of the thickness and the chemical composition of materials that are located between the density probe and the sample is shown in U.S. Pat. No. 3,846,631. This technique comprises passing two gamma ray beams from two intermittently operated gray sources into the sample, receiving the radiation back scattered from each of the two sources by two separate detectors, and building ratios of products of the four separate counting rates in such a manner that the numerical result is an indication of the density of the sample. In such longitudinally spaced two detector probes, which must be deployed against the borehole wall, the spacing between the detectors is a critical dimension. If the interferring formation materials are non-uniform over distances comparable to the spacing of the two detectors, the measured density will be erroneous.

In gamma radiation formation density probes, which include collimation of the gamma radiation, it is presupposed that the region of interaction between the radiation and the formation can be narrowly defined and restricted to a small region. Not only is precise collimation of gamma radiation beams difficult to accomplish, but the assumption that a collimated beam only interacts with a precisely definable portion of the formation surrounding the borehole is erroneous.

It would be an advantage therefore to overcome the limitations and inaccuracies of the prior art through a system for measuring the density of subterranean formations while drilling a borehole traversing the formation without the necessity of defining a narrow region of interrelation of gamma radiation with the formation or the employment of radiation collimation, or the necessity of tool deployment against the borehole wall.

The present invention provides such a system through novel geometry of a gamma radiation source and detectors which enables measurement of formation parameters from back-scattered gamma radiation without regard to the eccentric position of the tool within the borehole. The measurement is also made without regard to any assumption as to the particular region of the formation from which the radiation was back-scattered.

SUMMARY OF THE INVENTION

The present invention pertains to a system and method for measuring formation density by means of back-scattered gamma radiation in a logging-while-drilling system. One embodiment of the invention includes apparatus for logging the density of a formation surrounding a borehole which traverses the formation. The apparatus is adapted for use in a drill string and includes means for emitting gamma radiation into the formation and a plurality of detector means for counting gamma radiation scattered in the formation back to the apparatus. Each of the counting means is located an equal axial distance along the apparatus from the source and each is located symmetrically about the longitudinal axis of the apparatus. In one preferred embodiment of the invention the apparatus includes first and second detector means located on diametrically opposite sides of the apparatus.

Another aspect of the present invention includes a method for determining the average density of the earth formation surrounding a borehole traversing the formation and adjacent to the measuring apparatus. The method includes the steps of emitting gamma radiation into the formation and measuring the quantity of gamma radiation back-scattered from the formation at a plurality of detector locations. The detector locations are equally spaced along the axis of the borehole relative to the source from which radiation is emitted, and are located symmetrically about the longitudinal axis of the measuring apparatus.

In a further embodiment the invention includes a gamma radiation formation density logging apparatus for use in a borehole traversing an earth formation. The apparatus includes an elongate sonde having a longitudinal axis and a source of gamma radiation located within the sonde. A gamma radiation detection assembly is mounted within the sonde and includes first and second gamma radiation detectors each spaced the same distance in the same direction from the radiation source longitudinally along the sonde. Each detector is diametrically opposed on a common circle which lies in a plane normal to the longitudinal axis. Output signals from the first and second detectors obtained while the sonde is rotated about its longitudinal axis within the borehole are used to produce an output signal proportional to the matrix density of the formation surrounding the borehole in the region of the sonde. The sonde may comprise a cylindrical sub connected as part of a drilling string in a logging-while-drilling system.

In still another aspect of the invention, a method for borehole gamma radiation formation density logging comprises rotating an elongate sonde within the borehole while emitting gamma radiation into the formation from a first location within the sonde. The emitted gamma radiation scattered from the formation is detected at a second and a third location within the sonde where the second and third locations are diametrically opposed on opposite sides of the sonde and equally spaced in the same longitudinal direction from the first location. An output signal is produced in response to the gamma radiation detected at the second and third locations which is proportional to the matrix density of the formation surrounding the borehole in the region of the sonde.

In a further aspect, the invention includes a rotating device for use in a borehole traversing an earth formation with a drilling mud of known density filling the borehole and having a means for emitting gamma radiation into the formation surrounding the borehole. First and second gamma radiation detecting means are located on a common circle at diametrically opposed points with the first and second means being spaced the same axial distance in the same axial direction from the emitting means. Also included is a means for calculating matrix density which is responsive to the output signals from the detectors; the mud density value; first tool calibration factor associated with the first detector and related to the distance from the first detector to the emitting means, the metal between the detector and the borehole wall and the efficiency of the first detector; a second tool calibration factor associated with the second detector and related to the distance from the second detector to the emitting means, the metal between the detector and the borehole wall and the efficiency of the second detector; and a third tool calibration related to the difference between the diameter of the tool and the diameter of the borehole.

BRIEF DESCRIPTION OF THE DRAWING

For more complete understanding of the present invention and further objects and advantages thereof, reference may now be had to the following description taken in conjunction with the accompanying drawing, in which.

DETAILED DESCRIPTION OF THE PREFERRED EMBODIMENT

Figure 1:
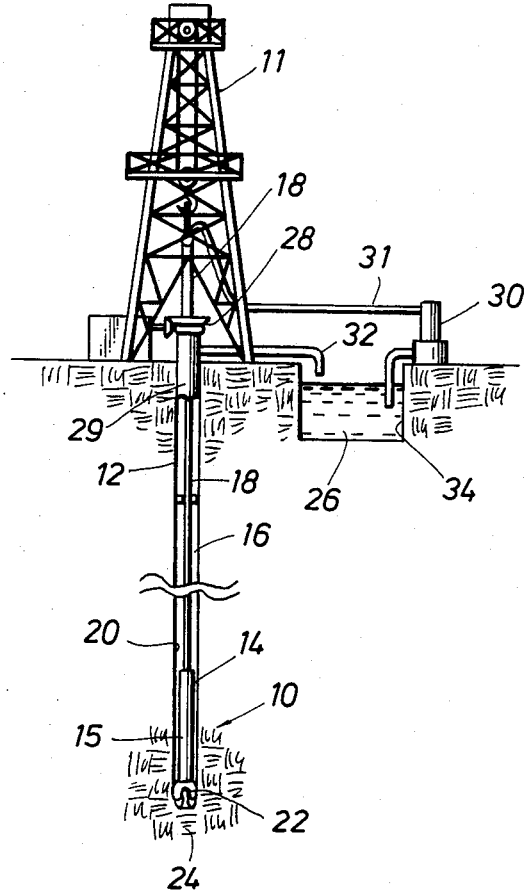
FIG. 1 is a diagramatic side-elevational view of a borehole drilling operation illustrating a system for formation density logging while drilling constructed in accordance with the teachings of the present invention.

Referring to FIG. 1, there is shown a drilling rig 11 disposed on top of a borehole 12. A system 10 for simultaneous gamma-gamma radiation formation density logging is carried by a sonde or sub 14 comprising a portion of a drill collar 15 and is disposed within the measurement of the density of the formations surrounding the borehole while the drilling operations are in progress.

A drill bit 22 is disposed at the lower end of drill string 18 and carves the borehole 12 out of the earth formations 24 while drilling mud 26 is pumped from the wellhead 28. Metal surface casing 29 is shown positioned in the borehole 12 above the drill bit 22 for maintaining the integrity of the borehole 12 near the surface. The annulus 16 between the drill string 18 and the borehole wall 20 creates a theoretically closed return mud flow path. Mud is pumped from the wellhead 28 by a pumping system 30 through mud supply line 31 coupled to the drill string 18. Drilling mud is, in this manner, forced down the central axial passageway of the drill string 18 and egresses at the drill bit 22 for carrying cuttings comprising the drilled sections of earth, rock and related matter upwardly from the drill bit to the surface. A conduit 32 is supplied at the wellhead for channeling the mud from the borehole 18 to a mud pit 34. The drilling mud is typically handled and treated at the surface by various apparatus (not shown) such as outgasing units and circulation tanks for maintaining a selected viscosity and consistency of the mud. The present gamma radiation formation density logging system permits the measurement of formation densities in the regions surrounding the borehole during the pumping of drilling fluid through the drill string and borehole.

As shown in FIG. 1, the sub 14 and drill collar 15 comprise a portion of the formation density logging system 10 of the present invention and the downhole environment. The system 10 is constructed to generate a series of signals for telemetry to the wellhead or a downhole recording system which signals are indicative of the formation matrix density of the earth formations adjacent to the borehole. The requisite telemetry and analysis systems are deemed to be of conventional design and are not specifically set forth or addressed herein. The method and apparatus for measurement of formation density is, however, described in detail below and is a subject of the present invention.

Figure 2:
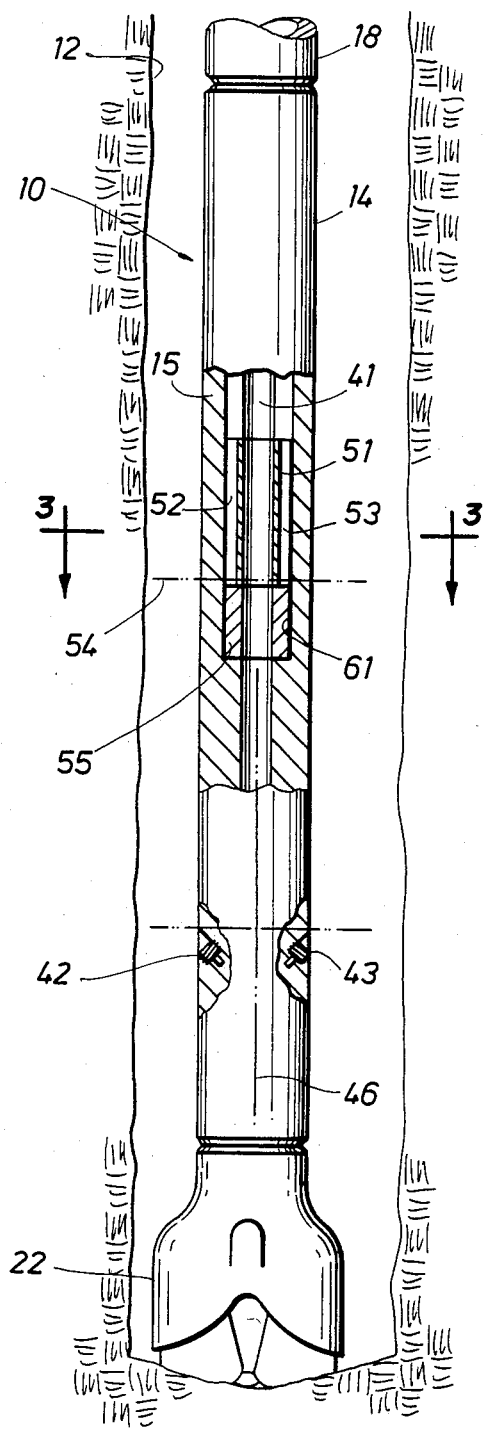
FIG. 2 is an illustrative, side-elevational, partially cross-sectional view of one embodiment of a downhole sub for gamma radiation formation density logging while drilling constructed in accordance with the teachings of the present invention.

Referring now to FIG. 2, there is shown an illustrative, diagramatic, and partially cross-sectional view of a sub 14 which carries a system constructed in accordance with the teachings of the present invention. The sub 14 preferably comprises a drill collar 15 which is coupled as part of the drill string 18, and although shown to be positioned immediately above the drill bit 22, this is merely illustrative and the sub 14 may be located at other positions in the drill string.

The sub 14 is formed from a section of drill collar 15 which includes a cylindrical inner bore 41 for the transmission of pressurized drilling fluid from the surface to the drilling bit 22. The collar 15 has been modified to include a pair of gamma radiation sources 42 and 43 each comprising a threaded insert to be received within threaded openings in the side walls of the collar 15. The sources of gamma radiation 42 and 43 may be any conventional sources such as cesium 137. While the system of the present invention will function adequately with a single source, the use of the two sources 42 and 43 insures that the radiation level is of a sufficient amplitude to produce large output signals from the detectors. Each of the two sources 42 and 43 are preferably located at a common axial position along the axis of the tool 10 and are illustrated as lying on a common diameter 44 which is perpendicular to the axial center line 46 of the drill collar 15.

The collar includes an enlarged central cylindrical cavity 61 coaxial with the bore 41 and extending partially the length of the collar 15. A pair of gamma radiation detectors 52 and 53 are positioned an axially spaced distance from the sources 42 and 43 within a detector packing and tungsten shielding insert 51 located at the lower end of a central cavity 61. The two detectors 52 and 53 are both located the same axial distance from the gamma radiation sources 42 and 43 and are shown to both lie in a common notional plane 54 which is also perpendicular to the center line 46 of the drill collar 15. Positioned between the sources 42 and 43 and the detectors 52 and 53, is a ring-shaped tungsten shielding insert 55 which is formed as part of the insert 51 and positioned in the body of the drill collar 15 in order to minimize the detection of gamma radiation from the sources which reaches the detectors by "streaming" of the radiation axially along the drill collar and bore 41. The radiation detectors 52 and 53 may comprise any conventional gamma radiation detecting means such as an array of Geiger-Mueller tubes or may consist of sodium iodide scintillators.

Figure 3:
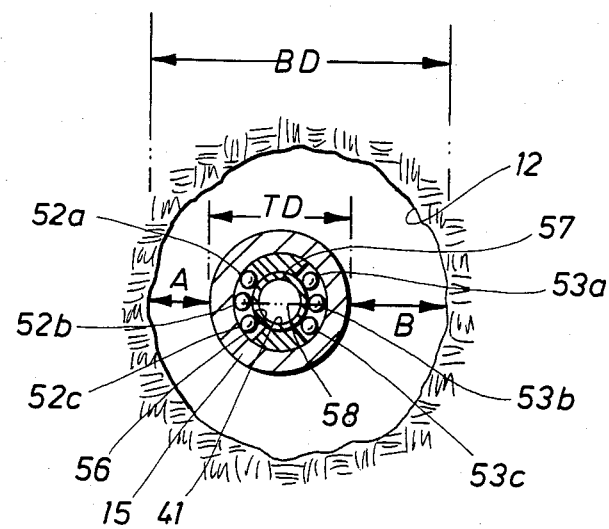
FIG. 3 is an illustrative, cross-sectional view taken through the line 3—3 of FIG. 2 showing the positioning of the radiation detectors within the apparatus of FIG. 2.

Referring now to FIG. 3, there is shown a illustrative top cross section view taken about the lines 3—3 of FIG. 2 which shows the relative positioning of the gamma radiation detectors 52 and 53 within the body of the drill collar 15. The left detector 52 is illustrated as comprising an array of three Geiger-Mueller tubes 52a–52c while the right detector 53 is illustrated as comprising an array of three Geiger-Mueller tubes 53a–53c. A tungsten shield member 56, also formed as part of the insert 51, is shown positioned between the left detector 52 and the bore 41 while a similar shield 57 is shown positioned between the bore 41 and the right detector 53. The shield members 56 and 57 minimize the detection by the detectors 52 and 53 of radiation which does not emanate from the formation.

A significant aspect of the novel geometry of the gamma-gamma radiation formation density logging system of the present invention is that the two detectors 52 and 53 are positioned symmetrically about the longitudinal axis of the collar 15 at equal azimuthal angles of separation from one another, i.e., 180 degrees, on diametrically opposite sides of the collar. The two detector arrays 52 and 53 both lie on a common diameter 58 of a common circle within the plane 54 perpendicular to the axis of the drill collar 15. Both detectors are also spaced an equal distance from the radiation sources 42 and 43. As is also shown in FIG. 3, the system of the present invention produces accurate measurement of formation density regardless of the eccentric position of the drill collar within the borehole 12 because the distances between the eccentered tool and the borehole wall are automatically compensated mathematically as well as by the averaging effects which occur when the tool is rotated during the logging operation.

In order to demonstrate the significance of the unique geometry of the components of the present invention and the mathematical consequences thereof, certain terms must be defined. The left standoff distance between the side wall of the borehole 12 and the drill collar 15 is "A", measured along the common diameter 58. Similarly, "B" is the right standoff distance between the side of the drill collar 15, also measured along the common diameter 58. The distance "TD", along the common diameter 58, is the diameter of the tool. "BD" is the diameter of the borehole. The two detectors 52 and 53 are seen to be located on opposite sides of the drill collar 15, and at equal axial distances from the gamma radiation sources 42 and 43, (or from a single source if such is employed). Thus, we can incorporate the geometry of the borehole itself to solve three equations simultaneously and determine the formation matrix density.

Using $\rho_l$ to indicate the density measured by the detector on the left side of the FIG. 3, we see that the formation density is given by:

$$\rho_l = [(1-100)\rho_{ma} + \phi\rho_f](1-\alpha) + \alpha\rho_m, \text{ or} \quad (1)$$

$$\rho_l = \rho'_{ma}(1-\alpha) + \alpha\rho_m, \text{ where} \quad (2)$$

$\rho_{ma}$ = formation matrix density;
$\phi$ = porosity of the formation;
$\rho_f$ = fluid density in the formation;
$\rho_m$ = mud density
$\alpha$ = fraction of gamma rays interacting in the mud; and
$\rho'_{ma} = (1-\phi)\rho_{ma} + \phi\rho_f$ = apparent formation density It should be noted that Equations 1 and 2 above are equally valid for wire line tool configurations as for gamma formation detection in measuring while drilling applications.

If we used $\rho_r$ to indicate the formation density measured by the detector on the right side of the FIG. 3, we see that the formation density is also given by:

$$\rho_r = \rho'_{ma}(1-\beta) + \beta\rho_m \quad (3)$$

where $\beta$ is the fraction of gamma rays interacting in the mud. We also know by geometry that the tool diameter, TD, and the borehole diameter, BD, are related to the tools position in the borehole by the following relationships:

$$A + B + TD = BD \quad (4)$$

where A is the perpendicular distance from the left toolface to the left borehole surface (the left standoff), and B is the standoff on the right side of the tool as shown in FIG. 3. It can be noted that the probability of a photon (gamma ray) traveling a distance A before having a collision is simply $\exp(-k_1 A)$. The probability of having an interaction at any distance less that A is given by $(1-\exp(-k_1 A))$. Likewise, the probability of having an interaction within the distance B is given by $(1-\exp(-k_2 B))$. The values $k_1$ and $k_2$ are geometric constants to be further specified below. If we assume the above relationships we may write the following:

$$\alpha = 1 - e^{-k_1 A} \quad (5) \text{ and}$$

$$\beta = 1 - e^{-k_2 B} \quad (6)$$

We imply that $\alpha$ and $\beta$ are probabilities that the gamma rays will interact in the mud, and $(1-\alpha)$ and $(1-\beta)$ are the probabilities that the photons will interact in the formation matrix, and not in the mud. If we now combine Equations 2 and 5, we find that:

$$\rho_l = \rho_m + e^{-k_1 A}(\rho'_{ma} - \rho_m) \quad (7)$$

The geometry physically constrains the tool in the borehole so that we can use the following relationship:

$$A = BD - TD - B = K_3 - B \quad (8)$$

so that we can rewrite Equation 5 in terms of the standoff B as follows:

$$\rho_l = \rho_m + e^{-k_1(k_3 - B)}(\rho'_{ma} - \rho_m) \quad (9)$$

We can also rewrite Equation 3 in terms of the standoff B as follows:

$$e^{-k_2 B} = (\rho_r - \rho_m)/(\rho'_{ma} - \rho_m) \quad (10)$$

or by raising to the power, $k_1/k_2$, we can write Equation 10 as follows:

$$e^{-k_1 B} = [(\rho_R - \rho_m)/(\rho'_{ma} - \rho_m)]^{k_1/k_2} \quad (11)$$

Now substituting Equation 11 into Equation 9, we find that:

$$\rho_L = \rho_m + e^{-k_1 k_3}(\rho'_{ma} - \rho_m)[(\rho'_{ma} - \rho_m)/(\rho_R - \rho_m)]^{k_1/k_2} \quad (12)$$

which can be solved for the formation matrix density, as follows:

$$\rho'_{ma} = \rho_m + [e^{k_1 k_2 k_3}(\rho_L - \rho_m)^{k_2}(\rho_R - \rho_m)^{k_1}]^{1/k_1 + k_2} \quad (13)$$

Now, if $k_1 = k_2$, and it will be shown later that they can be equal, we can write $k = k_1 = k_2$ and Equation 13 becomes the following statement:

$$\rho'_{ma} = [e^{k\ k_3}(\rho_l - \rho_m)(\rho_r - \rho_m)]^{\frac{1}{2}} + \rho_m \quad (14)$$

Based on upon these derivations, we can in principle determine the formation density based on the observed densities recorded by the left and right detectors, and on the density of the mud in use at the time of the measurements. The constant $k_3$ is determined directly from the difference between the tool diameter and the diameter of the borehole within which it is being used. The tool constants $k_1$ and $k_2$ are determined by the distance between the detectors and the source, the thickness of the drill collar wall between the detector and the exterior surface of the collar, and the efficiency of the detectors. For matched detectors and a symmetrical drill collar $k_1$ will equal $k_2$. The tool constants $k_1$ and $k_2$, are determined during calibration of the tool in a fashion similar to that in which conventionl wire line tools are calibrated in a test pit, as set forth below.

Figure 5:
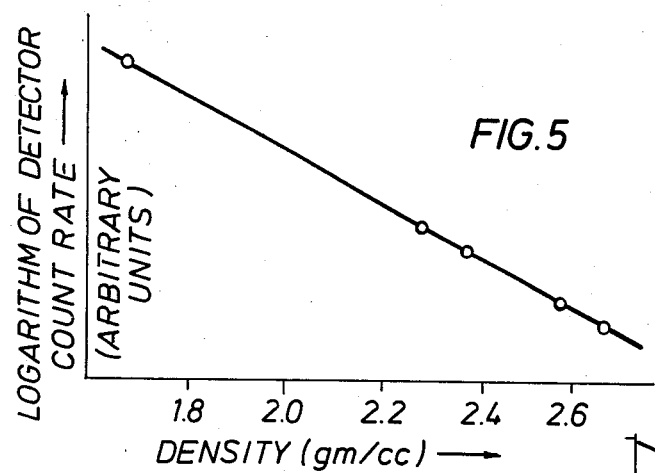
FIG. 5 is an illustrative graph showing a calibration curve for a radiation detector which relates count rate to formation density.
Figure 7:
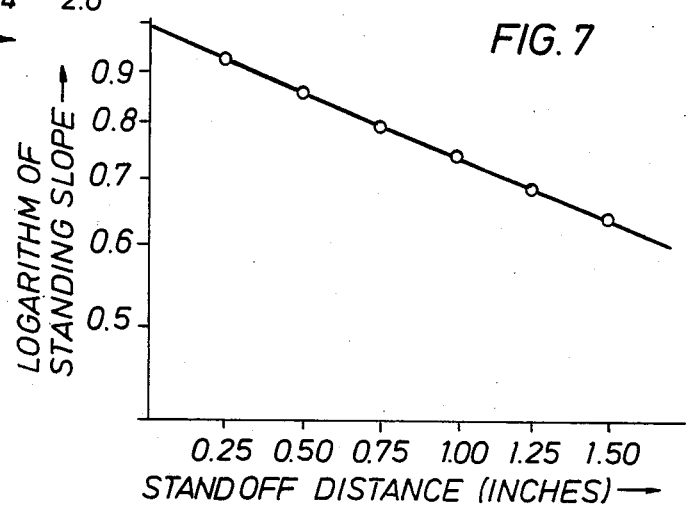
FIG. 7 is an illustrative graph which relates tool standoff distance to standoff slope and enables the determination of tool constants $k_1$ and $k_2$.
Figure 6:
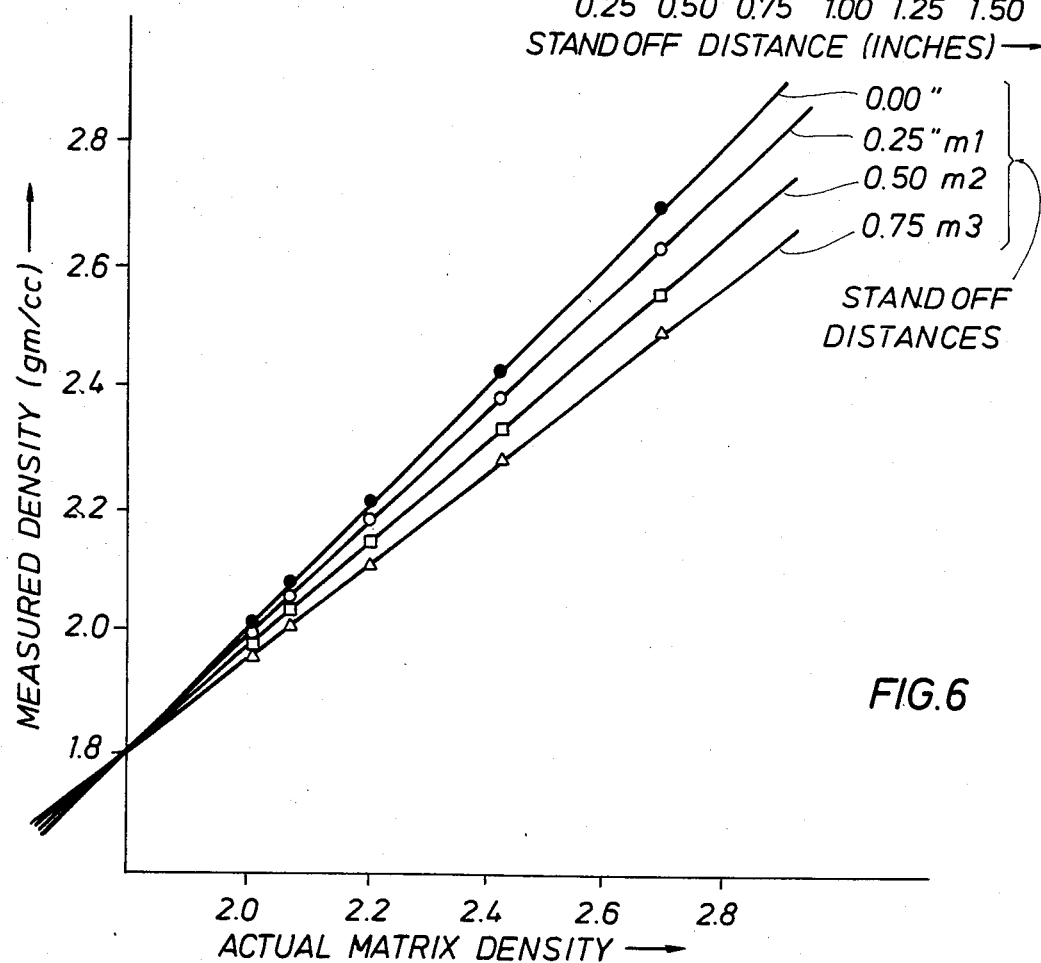
FIG. 6 is an illustrative graph showing a family of calibration curves which relate formation density measured by a detector in the present system and actual formation density for different standoff distances between the side of the sub and the walls of the borehole along the common diameter of the pair of detectors.

During calibration a test pit having a plurality of formations of known litholgies is used by exposing the tool to known density conditions. FIG. 5 is prepared convert the logarithm of the detector count rate (in any arbitrary units) to a density indication with the tool surface directly abutting the surface of the formation. Thereafter the tool is arranged at a preselected value of standoff distance and a series of formations of known density are logged to obtain an indication of measured density for each actual value as shown in FIG. 6. The tool is then arranged for a series of different standoff distances and the process repeated to produce a family of curves, as shown in FIG. 6. The logarithm of each line slope of the family of curves in FIG. 6 is plotted against standoff distance on semilog paper to produce a straight line with a negative slope as shown in FIG. 7. The slope of this line is the tool constant $k_1$, or $k_2$ associated with that detector.

Figure 4:
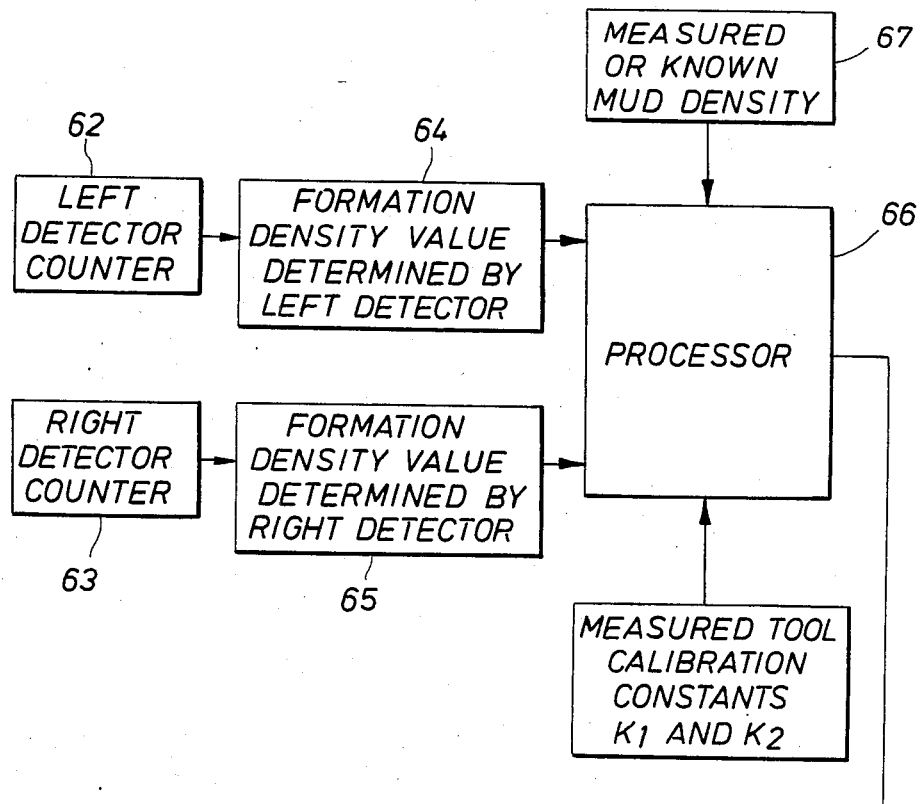
FIG. 4 is a block diagram of a processing system for calculating formation matrix density in accordance with the teachings of the invention.

As shown in FIG. 4, the count of the left detector 52 is determined at 62 while the count of the right detector 53 is determined at 63 per unit of time and, in conventional fashion, the formation density value is determined at 64 and 65 for the left and right detectors, respectively. Thereafter, this information is entered into the processor 66 along with either a measured or known mud density 67 and the measured tool calibration constants $k_1$ and $k_2$ from storage 68. The processor thereafter produces a calculated value of formation matrix density, and porosity can be inferred in accordance with standard practices in the industry.

The present technique involves three basic assumptions which allow the effectiveness of the present tool geometry in technique to be utilized. First, it is assumed that the borehole is relatively close to gauge and does not include a large number of wash outs or caves. In the region of the borehole near the drilling bit, this is a reliable assumption. However, in the event that this is not the case a caliper tool can be included in the system of the present invention in order to compensate for variations in borehole diameter. Nevertheless, this limitation is not nearly as critical as in the case with wire line gamma radiation density detectors since the present tool does not predicate the validity of its operations on wall contact as does the vast majority of wire line detectors. The second assumption is that the mudcake on the walls of the borehole has not had a chance to form during the logging of the well. Since the present tool operates during the measuring while drilling operation at a point near to the drill bit this assumption is reasonable. The third assumption is that mud density is known or readily determinable. This is also a very good assumption.

It should be understood that a gamma radiation formation density logging system in accordance with the principles of the present invention may be constructed with three or more detectors rather than two as is shown in the preferred embodiment. In each case each one of the detectors must lie in a plane perpendicular to the axis of the housing and be positioned at azimuthally symmetrical equal angles from one another, i.e., with rotational symmetry about the borehole axis. Of course, the equations for the determination of formation matrix density are increasingly more complex for structures with more than two arrays but may be solved in the same fashion as the two detector array configuration discussed above.

It should be also noted that the present logging apparatus has been shown within a housing or sonde comprising a drill collar forming part of a drill string. While the present system is especially useful in logging while drilling systems, the particular tool geometry could also be employed in a non-MWD sonde of the wireline type.

It is thus believed that the operation and construction of the present invention will be apparent from the foregoing description while the method and apparatus shown and described has been characterized as being preferred it will be obvious that various changes and modifications may be made therein without departing from the spirit and scope of the invention as defined in the following claims.

I claim:

1. A gamma radiation formation density logging apparatus for use in a borehole traversing an earth formation, comprising:

an elongated sonde having a longitudinal axis;
a source of gamma radiation located within said sonde;
a gamma radiation detection assembly within said sonde, including a plurality of gamma radiation detectors, at least two of said detectors being sensitive to gamma rays resulting from Compton scattering, said at least two detectors being spaced the same distance in the same longitudinal direction from said radiation source along said sonde and also being located symmetrically about the longitudinal axis of said sonde;
means connected to each of said at least two gamma radiation detectors for producing first output signals from each of said at least two detectors;
means to provide an indication of the density of the fluid in said borehole; and
means responsive to the said first output signals from said detectors and to said indication of said borehole fluid density for producing an additional output signal proportional to the density of the formation surrounding the borehole in the region of the sonde.

2. A gamma radiation formation density logging apparatus for use in a borehole traversing an earth formation as set forth in claim 1, including in addition thereto, a drilling string having a measurement while drilling system therein, wherein said sonde comprises a cylindrical sub connected in said drilling string as part of said measuring while drilling system.

3. A gamma radiation formation density logging apparatus for use in a borehole traversing an earth formation as set forth in claim 2, wherein said gamma radiation detectors comprise first and second detectors which are located on opposite sides of said sonde.

4. A gamma radiation formation density logging apparatus for use in a borehole traversing an earth formation as set forth in claims 1, 2 or 3 wherein said additional output signals are produced in response to said first output signals produced by said detectors while the sonde is being rotated about its longitudinal axis within the borehole.

5. A gamma radiation formation density logging apparatus for use in a borehole traversing an earth formation as set forth in claim 1 or 2 which also includes radiation shielding means positioned within said sonde in the region between said source of radiation and said detectors to limit the quantity of radiation received directly from said source.

6. A gamma radiation formation density logging apparatus for use in a borehole traversing an earth formation as set forth in claim 5 which also includes; radiation shielding means positioned within said sonde radially inward from each detector to limit the quantity of radiation received emanating from a region of the formation on the opposite side of the sonde from the detector.

7. A system for gamma radiation formation density logging for use in a borehole traversing an earth formation as set forth in claim 6, wherein said radiation detectors each comprises an array of scintillation detectors.

8. A system for gamma radiation formation density logging for use in a borehole traversing an earth formation, comprising:
a drilling string having a drilling bit at its lower end;
an elongate housing connected as part of said drilling string;
a source of gamma radiation located within said housing;
a gamma radiation detection assembly located within said housing and including a plurality of gamma radiation detectors, at least two of said detectors being sensitive to gamma rays resulting from Compton scattering, said at least two detectors being spaced the same distance in the same longitudinal direction along said housing from said source and also being positioned symmetrically about the longitudinal axis of said housing;
means connected to each of said at least two gamma radiation detectors for producing first output signals from each of said at least two detectors;
means to provide an indication of the density of the fluid in said borehole; and
means responsive to the said first output signals from said detectors produced while said housing is positioned within the borehole and to said indication of said borehole fluid density for producing an additional output signal proportional to the density of the formation surrounding the borehole.

9. A system for gamma radiation formation density logging for use in a borehole traversing an earth formation as set forth in claim 8 wherein said housing is connected into the drill string near the said drilling bit where the diameter of the borehole is relatively constant.

10. A system for gamma radiation formation density logging for use in a borehole traversing an earth formation as set forth in claim 8 or 9 which also includes radiation shielding means positioned within said housing in the region between said source of radiation and said detectors to limit the quantity of radiation received directly from said source.

11. A system for gamma radiation formation density logging for use in a borehole traversing an earth formation as set forth in claim 10 which also includes radiation shielding means positioned within said housing radially inward from each detector to limit the quantity of radiation received emanating from a region of the formation on the opposite side of the sonde from the detector.

12. A system for gamma radiation formation density logging for use in a borehole traversing an earth formation as set forth in claim 8, wherein said source of gamma radiation comprises two radiation sources located at a common axial position and lying in a common plane which is perpendicular to the axis of said housing.

13. A system for gamma radiation formation density logging for use in a borehole traversing an earth formation as set forth in claim 7, wherein said gamma radiation detectors comprise first and second detectors which are located on opposite sides of said housing.

14. A system for gamma radiation formation density logging for use in a borehole traversing an earth formation as set forth in claim 8 or 12, wherein said radiation source is cesium 137.

15. A system for gamma radiation formation density logging for use in a borehole traversing an earth formation as set forth in claim 7 or 12, wherein said additional output signal is produced in response to said first output signals obtained from said detectors while the housing is being rotated about its longitudinal axis in the borehole.

16. A system for gamma radiation formation density logging for use in a borehole traversing an earth formation as set forth in claim 7, wherein said radiation detectors each comprise an array of Geiger-Mueller tubes.

17. A method for gamma radiation formation density logging for use in a borehole traversing an earth formation, comprising:
positioning an elongate sonde within the borehole;
emitting gamma radiation into said formation from a first location within the sonde;
detecting at a plurality of locations within said sonde the emitted gamma radiation scattered from the formation, said locations being symmetrically positioned about the longitudinal axis of the sonde and equally spaced in the same longitudinal direction from the first location;
generating a signal indicative of the density of the borehole fluid; and
producing an output signal in response to the Compton scattered gamma radiation detected at said plurality of locations and to said borehole fluid density, said output signal being proportional to the matrix density of the formation surrounding the borehole in the region of the sonde.

18. A method for gamma radiation formation density logging as set forth in claim 17 wherein said positioning step includes rotating said sonde within the borehole and wherein said plurality of locations comprise second and third locations symmetrically disposed on opposite sides of the sonde.

19. An improved system for gamma ray formation density logging for use in a borehole traversing an earth formation of the tupe wherein gamma ray source and detection means are disposed within a housing positionable within a borehole for the emission and detection of gamma rays propagating through said earth formation, wherein said improvement comprises:
said housing being longitudinally connectable as part of a rotating drilling string extending into said borehole;
said gamma ray detection means comprising a plurality of gamma ray sensors, each of said sensors being responsive to Compton scattered gamma radiation, and each being disposed within said housing the same longitudinal distance from said source in a common plane lying perpendicular to the longitudinal axis of said housing and at equal angles from one another;

means connected to each of said gamma radiation detectors for producing first output signals from each of said detectors;

means to provide an indication of the density of the fluid in said borehole; and means responsive to said first output signals from said sensors and to said indication of said borehole fluid density for producing an additional output signal proportional to the density of said earth formation adjacent thereto.

20. The system as set forth in claim 19, including in addition thereto, a drill string in said system having a drilling bit at its lower end, and wherein said housing is a cylindrical sonde connectable into said drill string near the said drilling bit where the diameter of said borehole is relatively constant.

21. The system as set forth in claim 19, wherein said plurality of gamma ray sensors comprise first and second sensors disposed on opposite sides of the sonde.

22. The system as set forth in claim 19 wherein said additional output signal producing means is responsive to said first output signals from said sensors obtained while said drill string and housing are rotated.

23. The system set forth in claim 19, wherein said source comprises two radiation sources located at a common axial position and lying in a common plane which is perpendicular to the axis of said housing.

24. The system as set forth in claim 19, wherein said detection means comprises arrays of scintillation detectors.

25. An improved system for gamma ray formation density logging for use in a borehole traversing an earth formation of the type wherein gamma ray source and detection means are disposed within a cylindrical housing positionable within a borehole for the emission and detection of gamma rays propagating through said earth formation and borehole drilling mud, wherein said improvement comprises:

said housing being longitudinally connectable as part of a rotating drilling string extending into said borehole;

said gamma ray detection means comprising first and second gamma ray sensors, each of said sensors being responsive to Compton scattered gamma radiation, and each being geometrically disposed within said housing the same longitudinal distance from said source, in a common plane lying perpendicular to the longitudinal axis of said housing and equidistance from the center thereof;

means connected to each of said gamma ray sensors for producing first output signals from each of said sensors; and means for producing a formation density output signal while said drill string and housing are rotated, said density output signal being a function of said first output signals from each of said sensors, the density of said drilling mud within said borehole, the geometrical configuration of said sensors relative to said source and said borehole diameter relative to said housing diameter, and an established probability for the fraction of gamma rays interacting with said formation and said drilling mud.

26. A system for gamma radiation formation density logging for use in a borehole traversing an earth formation, wherein the borehole conntains a drilling mud of known density, comprising:

a rotating tool;

means within said tool for emitting gamma radiation into the formation surrounding said borehole;

first and second gamma radiation detector means located within said tool on a common circle at diametrically opposed points on said circle, said first and second detector means each being responsive to Compton scattered gamma radiation and each being spaced the same axial distance in the same axial direction from said emitting means, each of said detector means having a known efficiency, and each of said detector means being separated from the borehole wall by a known thickness of metal, and wherein the rotating tool has a known diameter compared to the diameter of the borehole;

means connected to said first and second detector means for producing first and second output signals, respectively, from said first and second detector means;

means for producing a third output signal related to the density of the drilling mud; and means for generating a fourth output signal functionally related to the density of the formation, said fourth output signal also being functionally related to the efficiency of said first and second detector means, the amount of metal between said first and second detector means and the borehole wall, the difference between the diameter of the tool and the diameter of the borehole, and the axial distance of said first and second detector means from said emitting means.

* * * * *

UNITED STATES PATENT AND TRADEMARK OFFICE
CERTIFICATE OF CORRECTION

PATENT NO. : 4,698,501

DATED : October 6, 1987

INVENTOR(S) : William C. Paske

It is certified that error appears in the above-identified patent and that said Letters Patent is hereby corrected as shown below:

In Column 12, line 12, delete "7" and insert therefor --8--.

In Column 12, line 21, delete "7 or 12" and insert therefor --8 or 13--.

In Column 12, line 27, delete "7" and insert therefor --8--.

Signed and Sealed this

Fifth Day of April, 1988

*Attest:*

DONALD J. QUIGG

*Attesting Officer*  *Commissioner of Patents and Trademarks*